United States Patent [19]

Takada

[11] 4,244,600
[45] Jan. 13, 1981

[54] DEACTIVATABLE LOCKING RETRACTOR FOR VEHICLE SEAT BELT SYSTEMS

[76] Inventor: Juichiro Takada, 3-12-1, Shinmachi Setagayaku, Tokyo, Japan

[21] Appl. No.: 21,633

[22] Filed: Mar. 19, 1979

[30] Foreign Application Priority Data

Apr. 18, 1978 [JP] Japan ............................ 53/044780

[51] Int. Cl.³ ................... A62B 35/02; B65H 75/48
[52] U.S. Cl. ................... 280/803; 242/107.4 A; 242/107.4 B
[58] Field of Search ............ 242/107.4 R–107.4 E; 280/801–808; 297/478

[56] References Cited

U.S. PATENT DOCUMENTS

| | | | |
|---|---|---|---|
| 3,991,953 | 11/1976 | Takada | 242/107.4 A |
| 3,995,787 | 12/1976 | Takada | 242/107.4 B |
| 4,036,322 | 7/1977 | Takada | 242/107.4 B X |
| 4,040,645 | 8/1977 | Giffen et al. | 242/107.4 A |
| 4,063,777 | 12/1977 | Takada | 242/107.4 B X |
| 4,090,735 | 5/1978 | Czernakowski | 242/107.4 A |

*Primary Examiner*—John M. Jillions
*Attorney, Agent, or Firm*—Brumbaugh, Graves, Donohue & Raymond

[57] ABSTRACT

A seat belt retractor having a main locking pawl for engaging the ratchet wheel on the reel to prevent the belt from being pulled out and a second pawl and ratchet responsive to either acceleration of the sensing pendulum or the inertia of an inertia assembly which senses acceleration of the reel when the belt is pulled out is disabled from being locked, thereby permitting the belt to be pulled out freely, by a blocking member which engages the second pawl to keep it from engaging the second ratchet and a device or system for moving the blocking member into and out of engagement with the second pawl. The invention is especially useful for door-mounted retractors used in connection with a passive seat belt restraint system.

1 Claim, 5 Drawing Figures

DEACTIVATABLE LOCKING RETRACTOR FOR VEHICLE SEAT BELT SYSTEMS

FIELD OF THE INVENTION

The present invention relates to belt retractors for use in vehicle passenger seat belt restraint systems and relates, in particular, to a retractor in which the locking mechanism is completely deactivated to allow the belt to be pulled out freely.

BACKGROUND OF THE INVENTION

Among the various types of belt retractors in use in vehicle passenger seat belt restraint systems are those which lock in response to a sharp or abrupt pull on the belt, such as that which occurs when the passenger is thrown forward abruptly in the event of a collision or upset of the vehicle, and those which are locked in response to the acceleration of a sensing pendulum. Some retractors are equipped with both of the aforementioned types of locking systems. For example, U.S. Pat. No. 3,991,953, issued Nov. 16, 1976, for "Automatic Locking Safety Belt Retractor" and assigned to Takata Kojyo Co., Ltd., describes and illustrates a retractor having both pendulum and reel inertia sensing devices which share certain elements and employ a second ratchet and pawl which are activated by either a pendulum or a reel inertia mechanism to engage a main pawl with a main ratchet wheel. The belt retractor of that patent can be designed to allow the belt to be pulled out freely, even at a relatively high rate of withdrawal, without locking while still locking in response to a relatively low acceleration of the pendulum (i.e., shifting of the pendulum upon acceleration or deceleration of the vehicle in an emergency situation) by means of the pendulum activated locking system.

In some cases, it is advantageous to mount a seat belt retractor on a vehicle door. This is particularly true in the case of passive restraint systems which are now coming into use, will be more widely used in the future, and will probably be required by government regulations. In addition to the convenience and effectiveness of the passive systems, the mounting of belt retractors on vehicle doors, particularly mounting between the inner and outer door panels, conserves space in the passenger compartment, another desirable aspect in the case of small automobiles.

One problem with a door mounted retractor is the possibility of the retractor being unintentionally locked when the door is swung open rapidly. Both pendulum actuated and inertially actuated retractors may be subject to locking in response to rapid door motion, thus abruptly stopping the door from opening further after locking and pulling the belt tightly across the passenger. In general, it is undesirable to make adjustments in a pendulum locking device or a reel inertia locking device, or both, to permit abrupt door movement because to do so would compromise the effectiveness of the locking retractor in an emergency situation.

SUMMARY OF THE INVENTION

There is provided in accordance with the present invention an improved automatic locking retractor in which the automatic locking system is completely deactivated upon opening the door. A retractor according to the present invention is particularly useful in a door-mounted installation, but it can also be used in other mounting positions, particularly in association with a passive belt system in which the belt is pulled out and moved to a passenger-releasing position in response to opening motion of the door.

The invention is directed to an improvement in a retractor of the type having a second ratchet which is coupled to and actuates a main pawl which, in turn, engages a main ratchet wheel on the belt reel to lock the reel against rotation in the belt pulled out direction. The second ratchet is engaged by a second pawl which is responsive to a pendulum, or an inertia assembly, and preferably both. The present invention involves blocking the second pawl in an inactive position so that it cannot engage the second ratchet, such blocking occurring upon a small movement of the door from fully closed. The disabling mechanism comprises a blocking member which is selectively engageable with the second pawl and an actuating device coupled to the blocking member to shift it into the blocking position in engagement with the second pawl in all positions of the vehicle door other than closed or cracked open a very small amount and to shift it into an unblocking position out of engagement with the second pawl when the door is closed or only slightly opened, thus permitting normal operation of the retractor.

A preferred embodiment of the invention, as illustrated in the accompanying drawings and described hereinafter, is an improvement in the retractor described and illustrated in U.S. Pat. No. 3,991,953 (referred to above), and reference may be made to that patent for a detailed description of the retractor locking system. The preferred embodiment is based on a retractor which is the same in principle to the retractor of the aforementioned patent, but in addition to providing a mechanism for disabling the locking system, certain other changes in the basic retractor have been made.

For a better understanding of the invention, reference may be made to the following description of an embodiment, taken in conjunction with the figures of the accompanying drawings.

DESCRIPTION OF EXEMPLARY EMBODIMENT

Figure 1:
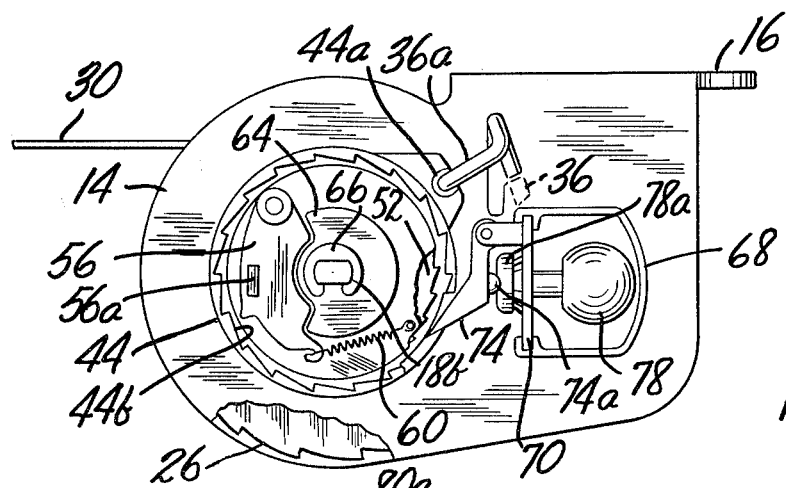
FIG. 1 is an end elevational view of the exemplary embodiment with portions broken away for clarity and with the cover and disabling mechanism removed, also for clarity.

The retractor comprises a generally U-shaped frame 10 which consists of a pair of side plates 12 and 14 connected by a cross piece 16. A shaft 18 is journaled in bushings 20 and 22 installed in the side plates. A belt reel 24 having ratchet wheels 26 and 28 on either end is fastened to the shaft 18 between the side plates and receives the end portion of a restraint belt 30. A spiral coil spring 32 having one end attached to the shaft 18 and the other end anchored to a spring retainer 34 affixed to the side plates 12 retracts a selected length of the belt 30 onto the reel 24 and yields to permit the length of belt to be pulled out but always to be held under tension. In response to a lock-actuating system described below, a main pawl 36, which is installed to pivot in generally triangular slots 40 and 42 in each of the side plates 12 and 14 of the frame 10 and is normally held inactive by a spring 38, engages the main ratchet wheels 26 and 28 and locks the reel against rotation in a direction such that the belt is unwound from the reel.

The lock actuating mechanism comprises a second ratchet wheel 44 which fits on a first reduced diameter portion 18a of the shaft 18. The ratchet wheel 44, though it is free to rotate on the shaft portion 18a, is linked by reception of a lug 36a on the main pawl 36 within a slot 44a in a boss projecting out from the reel, and the ratchet wheel 44 is, therefore, normally held in a restrained, fixed position by the spring 38. The ratchet wheel 44 has internal ratchet teeth 44b adjacent the free edge of the circumferential flange portion. The flange portion also has a slot 44c, the purpose of which is described below.

Figure 3A:
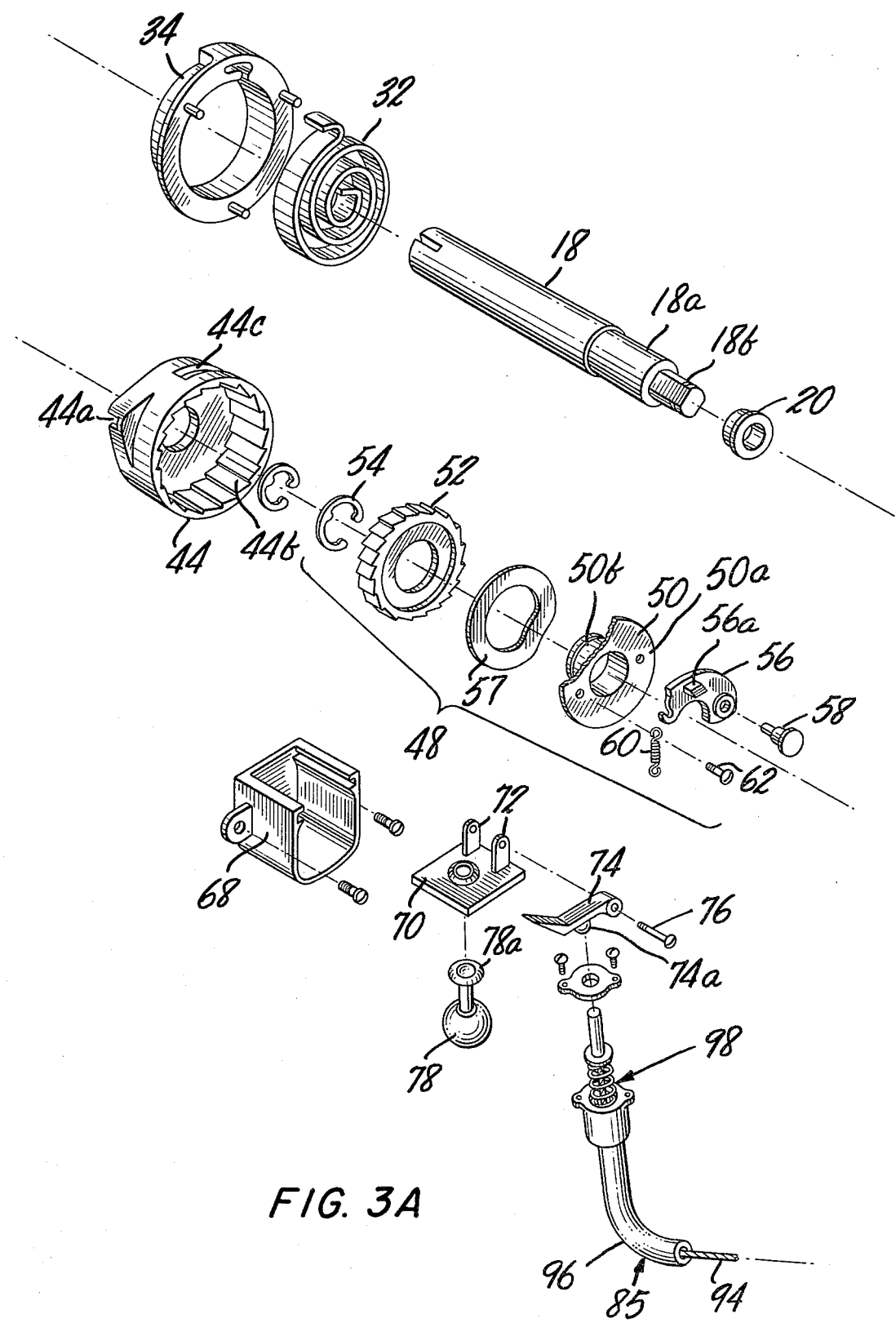
FIGS. 3A and 3B taken together make up an exploded pictorial view of the retractor.
Figure 3B:
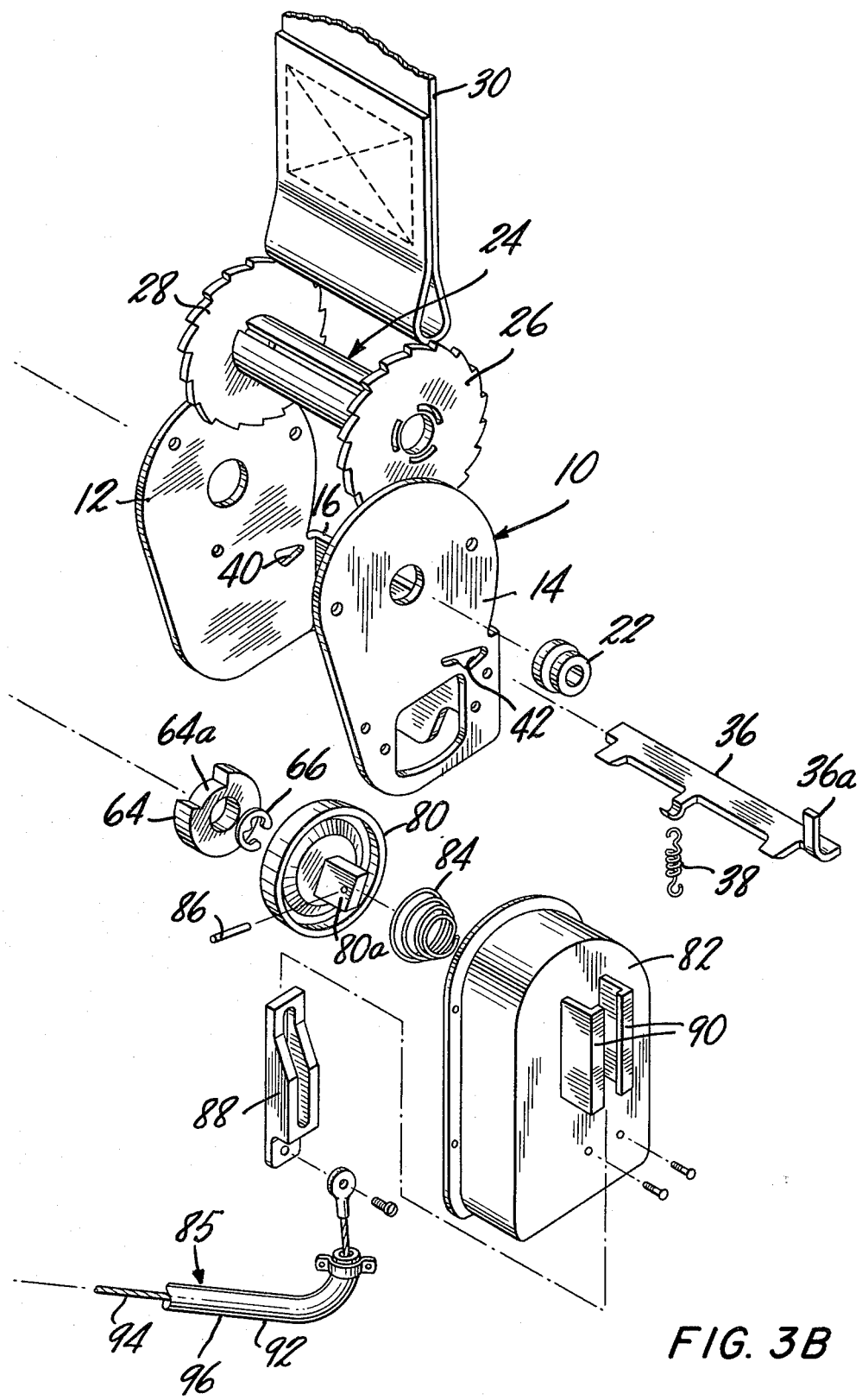

The shaft portion 18a receives an inertia assembly 48 which consists of the following components:

An inertial disc which is composed of an annular flange portion 50a (a portion of which is broken away in FIG. 3A) and a hub portion 50b which fits freely onto the shaft portion 18a for rotation;

A third ratchet wheel 52 having external ratchet teeth and received freely on the hub portion 50b and held in place by an E-ring 54;

A Belleville or similar type of spring washer 57 installed under compression between the ratchet wheel 52 and the flange portion 50a of the inertia disc 50; and A second pawl 56 fastened to pivot on a pin 58 received by the disc portion 50a and pulled toward the axis of the shaft by a spring 60 fastened between the free end of the pawl and the flange portion 50a by a screw 62.

A second reduced diameter end portion 18b formed with flats receives a cam member 64 having cam surfaces 64a which generally match the inner profile or edge of the second pawl 56. The cam member 64 is non-rotatable on the shaft by means of the flat and is held in position by an E-ring 66.

Just below the second ratchet and the inertia assembly is a pendulum assembly which comprises a housing 68 fastened to the side frame member 14, a pendulum support plate 70 which fits in tracks on the housing and has small supports 72 on which a third pawl 74 is pivoted by means of a pin 76. A pendulum 78 is supported by the plate 70 and has a head portion 78a which works against a pin 74a on the pawl 74 in the manner of a cam and cam follower. In the absence of an inertia force sufficient to rock the pendulum and pivot the pawl 74 about the pin 76 upwardly, the pawl 74 does not engage the third ratchet wheel 52, but the pawl 74 projects through the slot 44c in the second ratchet wheel and is engageable with the third ratchet wheel when the pendulum tilts in any direction to a substantial inclination to the vertical in response to acceleration in an emergency situation.

Apart from the specific configuration of the components of the inertia assembly and the second ratchet wheel, the mechanism described above is substantially identical in structure and principle of operation to the retractor described and shown in U.S. Pat. No. 3,991,554 (referred to above). The retractor is locked against pull-out of the belt in response to either a sharp pull on the belt 30, which produces a relatively high acceleration of the reel and shaft, or in response to acceleration of the pendulum 78.

In the absence of a sharp pull on the belt, including relatively rapid pull-out of the belt, the inertia assembly 48 rotates with the cam member 64, inasmuch as the spring 60 holds the assembly 48 and the cam 64 together as long as the acceleration of the reel and shaft are insufficient to overcome the force in the spring 60. If an abrupt pull-out force is exerted on the belt, such as in an emergency situation, the acceleration of the cam member 64 will exceed the inertia of the inertia assembly 48 and the force of the spring 60, which will result in rotation of the cam member 64 relative to the inertia assembly 48. Such relative rotation causes the substantially matching cam and cam follower surfaces of the cam member 64 and the second pawl 56 to pivot the second pawl outwardly into engagement with the internal ratchet teeth 44b of the second ratchet wheel 44. Such engagement locks the second ratchet to the second pawl which, in turn, is locked to the cam, thus producing counter-clockwise rotation (with respect to FIG. 1) of the entire assembly (i.e., the second ratchet wheel 44, the inertia assembly 48 and the cam member 64). Rotation of the second ratchet wheel is transmitted to the main pawl 36 through the lug or arm 36a, thus engaging the main pawl with the main ratchet wheels 26 and 28 and, in turn, securely locking the reel against unwinding of the belt.

Essentially the same locking action described above also occurs upon acceleration of the pendulum 78 in any direction to an extent sufficient to engage the third pawl 74 with the third ratchet wheel 52; such engagement locks the inertia assembly against rotation (subject to slippage of the inertia disc in the manner described hereinafter), and any pull-out on the belt producing rotation of the shaft 18 and the cam 64 engages the second pawl 56 with the second ratchet wheel 44 which, in turn, engages the main pawl 36 with the main ratchet wheels 26 and 28.

Figure 2A:
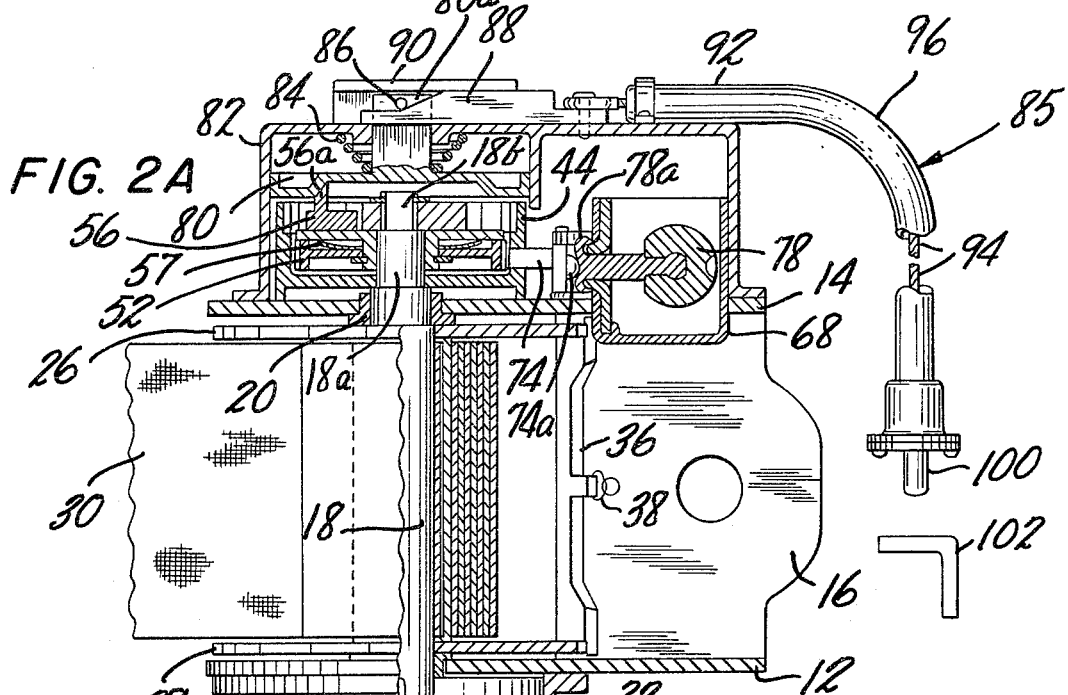
FIG. 2A is a top cross-sectional view of the embodiment taken generally along the axis of the belt reel and showing the disabling mechanism in engagement to disable operation of the locking mechanism.
Figure 2B:
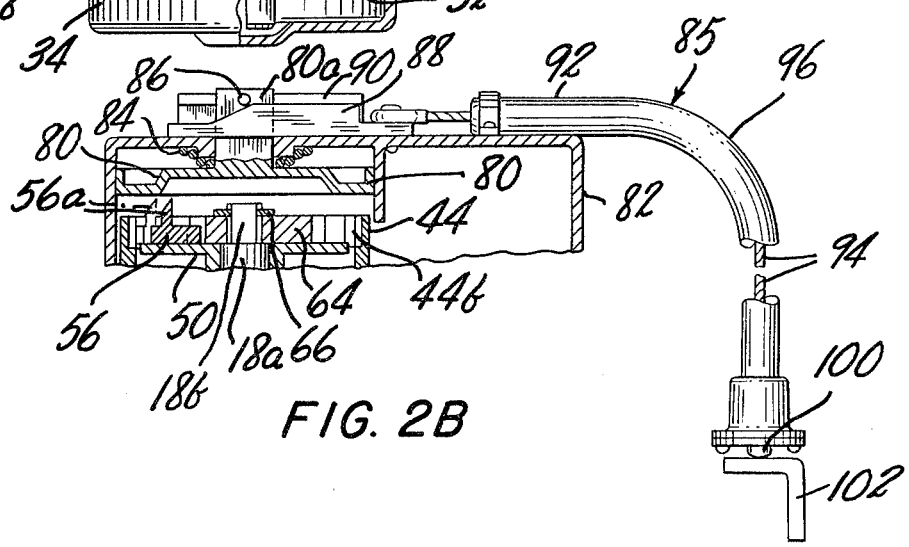
FIG. 2B is a partial, top cross-sectional view of the outward portion of the retractor and shows the disabling mechanism in the unblocking position.

The lock actuating mechanisms described above are inactivated by a mechanism which selectively engages the second pawl 56 and prevents it from being pivoted out to engage the second ratchet wheel. Such mechanism includes a blocking member 80 which is mounted on a bracket or support 82 which also serves as a cover for the entire locking assembly. The blocking member 80 is in the general format of a disc, an annular portion of which selectively engages an outwardly projecting boss 56a on the second pawl 56 in all positions of the pawl about the axis of the shaft 18. The blocking member 80 has a mounting post 80a which extends through a matching hole in the support 82. The blocking member 80 is urged toward the lock-actuating member by a spring 84 and is shifted between a blocking position (FIG. 2A) and an unblocking position (FIG. 2B) by an actuating linkage 85, which may be any of a number of suitable mechanical linkages and which could also employ an electrical solenoid or a pneumatic device. In the exemplary embodiment, the actuating linkage includes a cam follower in the form of a pin 86 installed on the post 80a, a movable cam member 88 received within guide flanges 90 on the support 82 and an actuating cable 92 which consists of a wire 94 connected at one end to the cam member 88, confined within a sheath 96 and spring-loaded in a direction to pull the cam member 88 in a direction unblocking the second pawl by a plunger assembly designated generally by the reference numeral 98. The plunger pin 100 works against a strike on the door. When the door is closed, the pin 100 is depressed and drives the wire through the sheath and shifts the cam member 88 upwardly (FIG. 2B) to cam the follower pin outwardly and pull the blocking member 80 away from the second pawl, thus entirely freeing the lock-actuating mechanism for normal operation. When the door is opened just a crack sufficient to allow the plunger assembly (which is assisted somewhat by the spring 84 working against the cam surface of the cam member) to extend (FIG. 2A) the cam member 88 moves down, and the spring 84 pushes the blocking member into engagement with the boss 56a on the second pawl. When the door is opened further, even though the belt may be pulled sharply enough to accelerate the reel and shaft at a rate greater than the inertia of the inertia assembly and the force of the spring 60, the blocking member 80 keeps the pawl from shifting out and forces the inertia assembly to rotate with the cam. The boss 56a on the second pawl orbits with the shaft within the annular blocking surfaces on the blocking member 80.

Even though the pendulum may be accelerated sufficiently to lock the third pawl to the third ratchet, the lock-actuating mechanism remains inactivated. The spring washer 57 permits the inertia disc to rotate (by slippage between the washer and the disc). Accordingly, the disc and second pawl are again free to rotate, and the belt is free to be pulled from the reel. Thus, there is provided in accordance with the invention an improved retractor which is particularly well suited for use with a passive restraint belt system, especially on a vehicle door. The retractor is completely inactivated from becoming locked. The belt can be pulled from the reel at any speed without causing the retractor to lock by means of the pull-out rate sensing system, i.e., the inertia locking mechanism, and the door can be swung abruptly without locking the reel even though the pendulum is accelerated to a point which locks the third pawl in the third ratchet.

It will be readily apparent to those skilled in the art that various mechanical, electrical and pneumatic devices can be employed to engage and disengage the blocking member with and from the lock-actuating mechanism. Those possible modifications, together with others that will be apparent to those skilled in the art, are intended to be included within the scope of the invention as defined in the appended claims.

I claim:

1. In a belt retractor for use in a vehicle passenger seat belt restraint system which includes a frame, a shaft journaled on the frame, a belt-retracting reel affixed to the shaft, a spiral leaf spring having one end joined to the frame and the other to the shaft to rotate the reel and shaft in the direction to wind the belt onto the reel, at least one main ratchet wheel rotatable with the reel, and a main locking pawl selectively engageable with the main ratchet wheel to prevent the reel from rotating in a direction in which the belt is unwound from the reel, the improvement in a lock-actuating mechanism responsive to both acceleration of a sensing pendulum and the inertia of an inertia assembly which detects acceleration of the reel when the belt is pulled out comprising a cup-like second ratchet wheel mounted for rotation on the shaft, having internal ratchet teeth along an outward edge of a peripheral flange thereof spaced outwardly from one side frame portion of the frame and coupled to the main pawl to pivot it into engagement with the main ratchet wheel upon rotation of the second ratchet wheel against the force of a spring which biases the main pawl and second ratchet wheel in a direction maintaining the main pawl out of engagement with the main ratchet wheel; an inertia assembly having a cam member located radially inwardly of the ratchet teeth of the second ratchet wheel and affixed to the shaft for rotation therewith; an inertia disc received on the shaft for rotation relative to the shaft and located axially inwardly toward the reel from the cam member, a second pawl pivoted on a flange portion of the inertia disc and urged by a spring into engagement with a cam surface on the cam member with a force such that the disc and the components associated with it rotate with the cam member and shaft up to a selected acceleration of the reel in a direction in which the belt is withdrawn, the spring yielding and permitting rotation of the cam member relative to the inertia disc and associated components upon acceleration of the reel in said direction in excess of the selected acceleration, whereby the cam member pushes the second pawl out into engagement with the second ratchet wheel to cause rotation of the second ratchet wheel and engagement of the main pawl with the main ratchet wheel, a third ratchet wheel mounted on a sleeve portion of the inertia disc inwardly of a flange portion thereof for rotation relative thereto, a clutch spring engaged between the third ratchet wheel and the inertia disc to couple the third ratchet wheel and the inertia disc for conjoint rotation but affording forced rotation of the inertia disc relative to the third ratchet wheel; a pendulum mounted to pivot in all directions about a vertical axis upon acceleration thereof; a third pawl associated with the pendulum and actuated by pivoting of the pendulum to engage external ratchet teeth on the third ratchet wheel, thereby to stop rotation of the inertia assembly and produce engagement between the second pawl and the second ratchet wheel, and in turn, the main pawl and the main ratchet wheel to lock the reel; and a disabling mechanism for preventing locking of the reel including a blocking member selectively engageable with the second pawl to prevent it from moving outwardly to engage the second ratchet wheel, the blocking member being mounted on a fixed support member outwardly of the blocking member for sliding movement toward and away from the second pawl axially of the axis of rotation of the inertia disc and including an annular portion engageable with a boss projecting outwardly relative to the frame in all positions of the second pawl, and actuating means coupled to the blocking member for shifting it between a blocking position in engagement with the second pawl and an unblocking position out of engagement with the second pawl including a compression spring engaged between a portion of the blocking member and the support member and urging the blocking member toward the inertia disc for engagement with the second pawl, a cam follower on the blocking member, a cam member mounted to slide transversely relative to the axis of rotation of the inertia disc and having a cam surface oblique to said axis and engaging the follower to move the blocking member axially outwardly against the spring to the unblocking position, and a linkage coupled to the cam member and engageable by the vehicle door for moving the cam member in response to opening and closing motion of the door.

* * * * *